July 2, 1957 R. H. LACART 2,797,552
SWIVEL FITTING FOR REFRIGERANT RECEIVER
Filed Aug. 19, 1954

INVENTOR.
ROLLIN H. LACART
BY
Roland C. Rehm
ATTORNEY

United States Patent Office 2,797,552
Patented July 2, 1957

2,797,552

SWIVEL FITTING FOR REFRIGERANT RECEIVER

Rollin H. Lacart, Chicago, Ill., assignor to Madden Brass Products Co., Chicago, Ill., a corporation of Illinois Application August 19, 1954, Serial No. 450,897

2 Claims. (Cl. 62—115)

The invention relates to swivel-T fittings for lines in refrigerating and air conditioning units.

In many such units it is often desirable, and in many cases required, to insert a relief valve in the line leading to the refrigerant receiver. Limitations of space have made it impossible to insert a conventional T (to the branch of which the relief valve is connected) because of the impossibility of rotating the T to connect it in the line. This made it necessary to use a plurality of fittings, thereby increasing the number of connections and potential points for leakage of refrigerant.

The present T is characterized by a swivel nut at one end of the run, thereby making it possible to connect the T in the line without bodily rotating it or the relief valve connected to the branch of the T, and the relief valve can thus be located in the most favorable position at the time the fitting is connected in place. The branch of the T also provides a means for connecting gauges, testing devices, etc., to the refrigerant line.

The nature of the invention and further details thereof may be readily understood by reference to one construction embodying the invention and illustrated in the accompanying drawing.

A relief valve is desirable in refrigerating units to protect the same against development of dangerous pressures in the receiver, and ordinances often require them, particularly on so-called hermetic units employed for domestic refrigeration and air-conditioning. While some such units come equipped with a safety plug or rupturable diaphragm to relieve excessive pressure, operation of the latter type of safety device means the loss of all refrigerant, whereas if a relief valve be employed, escape of only enough refrigerant to bring the pressure in the receiver down to a safe level, is involved.

Figure 1:
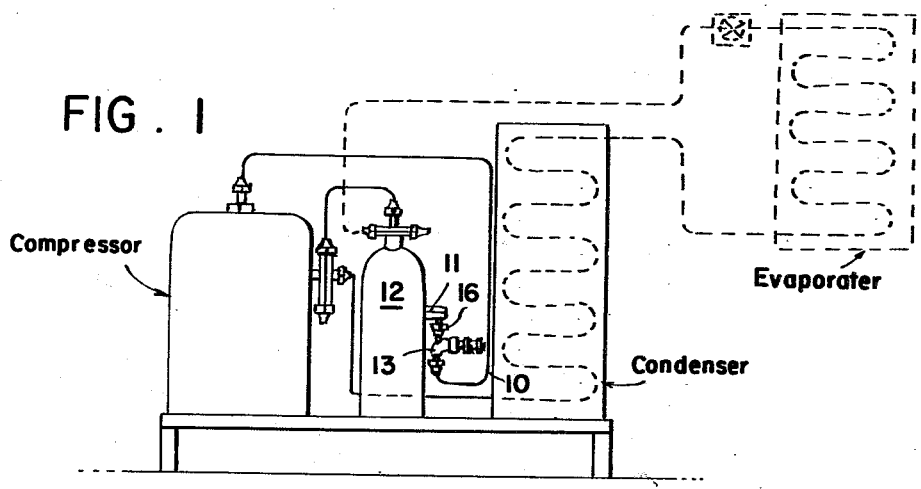
Fig. 1 is a diagram showing a typical refrigerating unit, the evaporator to which the unit is connected being shown in dotted lines.
Figure 2:
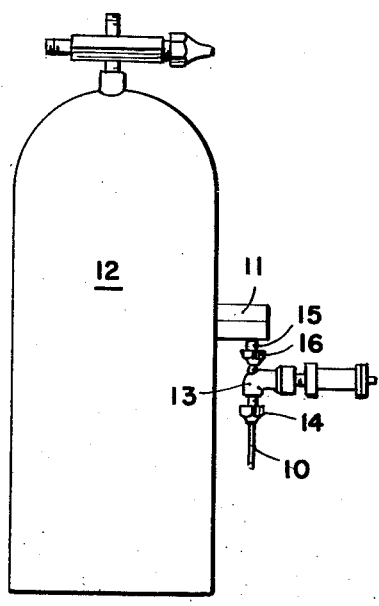
Fig. 2 is an enlarged view of a refrigerant receiver, in the inlet line of which a swivel-T has been inserted, and illustrating the space limitations in the commercial units which prevent rotation of the T to connect it in the line.
Figure 3:
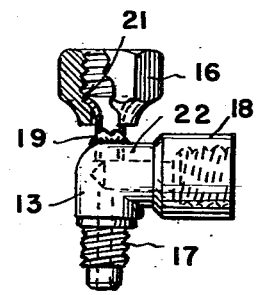
Fig. 3 is an elevation on a larger scale, of the illustrative swivel-T.

As shown in Figs. 1 and 2, the refrigerant line 10 leading to the inlet fitting 11 of the receiver 12 lies so close to the receiver and possibly other pieces of apparatus, that it is impossible to rotate a conventional T to thread it into the inlet fitting 11. In this connection it should be understood that before insertion of the swivel-T 13 (presently described) in the line, the female nut 14 on the line 10 will have been directly connected to the male flare 15 or equivalent on the inlet fitting 11.

In the illustrative swivel-T 13, the female flare nut 16 is swiveled, thereby permitting the T to be connected to the fitting (in this case a threaded male flare on the inlet fitting 11) by rotating the nut 16 while holding the body of the T 13 stationary.

The female flare nut 14 on line 10 can, of course, be connected to the threaded male flare 17 of the T without rotating the latter. Preferably the relief valve or other device to be connected with the receiver inlet, is tightly threaded in the threaded female connection 18 terminating the branch of the T 13.

The female flare nut 16 may advantageously be connected with the T 13 providing the latter with a projecting tube 19 over which the nut 16 is slipped, after which the end of tube 19 is flared as at 21 in the usual manner. While tube 19 may be forged integral with the T, it is preferable to braze or solder a short section of copper tubing in the body 22 of the T.

Figure 4:
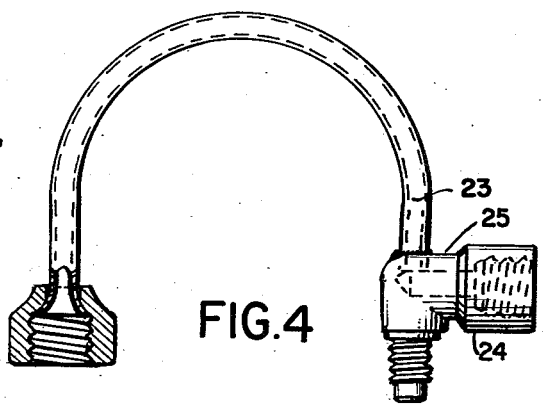
Fig. 4 is an elevation of a modified form of swivel-T provided with an extension on the swivel end for installation in those units whose space limitations provide no room for a relief valve or other device closely adjacent to the receiver.

In Fig. 4 is illustrated a swivel-T with an extended tube 23 on the swivel end for use with refrigerating units which lack the space adjacent to the inlet fitting and the receiver for connecting a relief valve or other device with the branch 24 of the T. The extension 23 may be bent into the conformation necessary to off-set the branch 25 to a point allowing enough space for a relief valve, gauge or other device.

In inserting a swivel-T in the line, the service man preferably "pumps down" the unit to transfer substantially all the refrigerant to the receiver. The valves are then closed before opening line 10, thereby avoiding loss of refrigerant. A relief valve or other device may thus be connected with the line quickly and efficiently and with a minimum of additional joints at which leakage might occur.

Obviously the invention is not limited to the details of the illustrative construction since these may be variously modified. Moreover, it is not indispensable that all features of the invention be used conjointly since various features may be used to advantage in different combinations and subcombinations.

Having described my invention, I claim:

1. Refrigeration apparatus comprising a refrigerant receiver, a supply line therefor, and means for connecting a pressure responsive instrumentality in said line comprising a pipe fitting including a rigid run having a male threaded terminal at one end and having a female threaded terminal rotatably mounted on its other end, one end being connected to said line and the other end to said receiver, and a branch rigidly projecting substantially radially from said run and having said instrumentality connected thereto.

2. Refrigeration apparatus comprising a refrigerant receiver, a supply line therefor, and means for connecting a pressure responsive instrumentality in said line comprising a pipe fitting including a rigid run having a male threaded terminal at one end connected to a female threaded coupling in said line and having its other end radially flared, a female threaded terminal mounted on said other end for rotation about the axis of the run and held captive on said run by engagement with said flared end and connected to said receiver, and a branch rigid with said run projecting substantially radially therefrom and terminating in a female threaded coupling portion engaged with the threaded male terminal of said instrumentality.

References Cited in the file of this patent

UNITED STATES PATENTS

| | | |
|---|---|---|
| 1,447,550 | Heim | Mar. 6, 1923 |
| 1,533,336 | Pownall | Apr. 14, 1925 |
| 1,883,921 | Hull | Oct. 25, 1932 |
| 2,225,701 | Gorre | Dec. 24, 1940 |
| 2,477,677 | Woodling | Aug. 2, 1949 |
| 2,505,303 | Randa | Apr. 25, 1950 |
| 2,537,612 | Wildermuth | Jan. 9, 1951 |